United States Patent
Chambers et al.

(10) Patent No.: US 9,688,248 B2
(45) Date of Patent: Jun. 27, 2017

(54) VEHICLE SECURITY ARRANGEMENT

(71) Applicants: Gregory Chambers, Kingsbridge (GB);
Paul Jonathan Maisey, Castle Bromwich (GB); Karl Eaton, Sulton Coldfield (GB)

(72) Inventors: Gregory Chambers, Kingsbridge (GB);
Paul Jonathan Maisey, Castle Bromwich (GB); Karl Eaton, Sulton Coldfield (GB)

(*) Notice: Subject to any disclaimer, the term of this patent is extended or adjusted under 35 U.S.C. 154(b) by 0 days.

(21) Appl. No.: 14/890,036

(22) PCT Filed: May 2, 2014

(86) PCT No.: PCT/GB2014/051367
§ 371 (c)(1),
(2) Date: Nov. 9, 2015

(87) PCT Pub. No.: WO2014/181094
PCT Pub. Date: Nov. 13, 2014

(65) Prior Publication Data
US 2016/0121851 A1    May 5, 2016

(30) Foreign Application Priority Data

May 9, 2013 (GB) .................................. 1308319.1
Sep. 26, 2013 (GB) .................................. 1317137.6

(51) Int. Cl.
*B60R 25/00* (2013.01)
*B60R 25/30* (2013.01)

(52) U.S. Cl.
CPC .............. *B60R 25/30* (2013.01); *B60R 25/00* (2013.01)

(58) Field of Classification Search
CPC ......... B60R 25/00; B60R 25/20; B60R 25/23; B60R 25/30
See application file for complete search history.

(56) References Cited

U.S. PATENT DOCUMENTS

| | | |
|---|---|---|
| 2005/0184856 A1 | 8/2005 | Pourchot |
| 2008/0214022 A1 | 9/2008 | Kowalick |
| 2010/0036985 A1 | 2/2010 | Zinser |
| 2013/0151111 A1* | 6/2013 | Skelton .................. B60R 16/02 701/99 |

FOREIGN PATENT DOCUMENTS

| | | |
|---|---|---|
| DE | 202013000205 | 2/2013 |
| EP | 0400264 | 12/1990 |
| EP | 2056259 | 5/2009 |

* cited by examiner

*Primary Examiner* — Michael D Lang
(74) *Attorney, Agent, or Firm* — Walter A. Rodgers

(57) ABSTRACT

A security arrangement for a motor vehicle having a vehicle management system and an on board diagnostics port to permit the external interrogation of the management system. The security arrangement includes a blocker having an electrical line, a switch and a controller to control the position of the switch, the switch having a closed position in which the electrical line is complete and an open position in which the electrical line is incomplete. The controller has a record of an identifier and is configured to close the switch when the identifier is communicated to the controller. The identifier can be communicated to the controller by way of data-input means or by a removable adaptor.

12 Claims, 2 Drawing Sheets

VEHICLE SECURITY ARRANGEMENT

FIELD OF THE INVENTION

Figure 1:
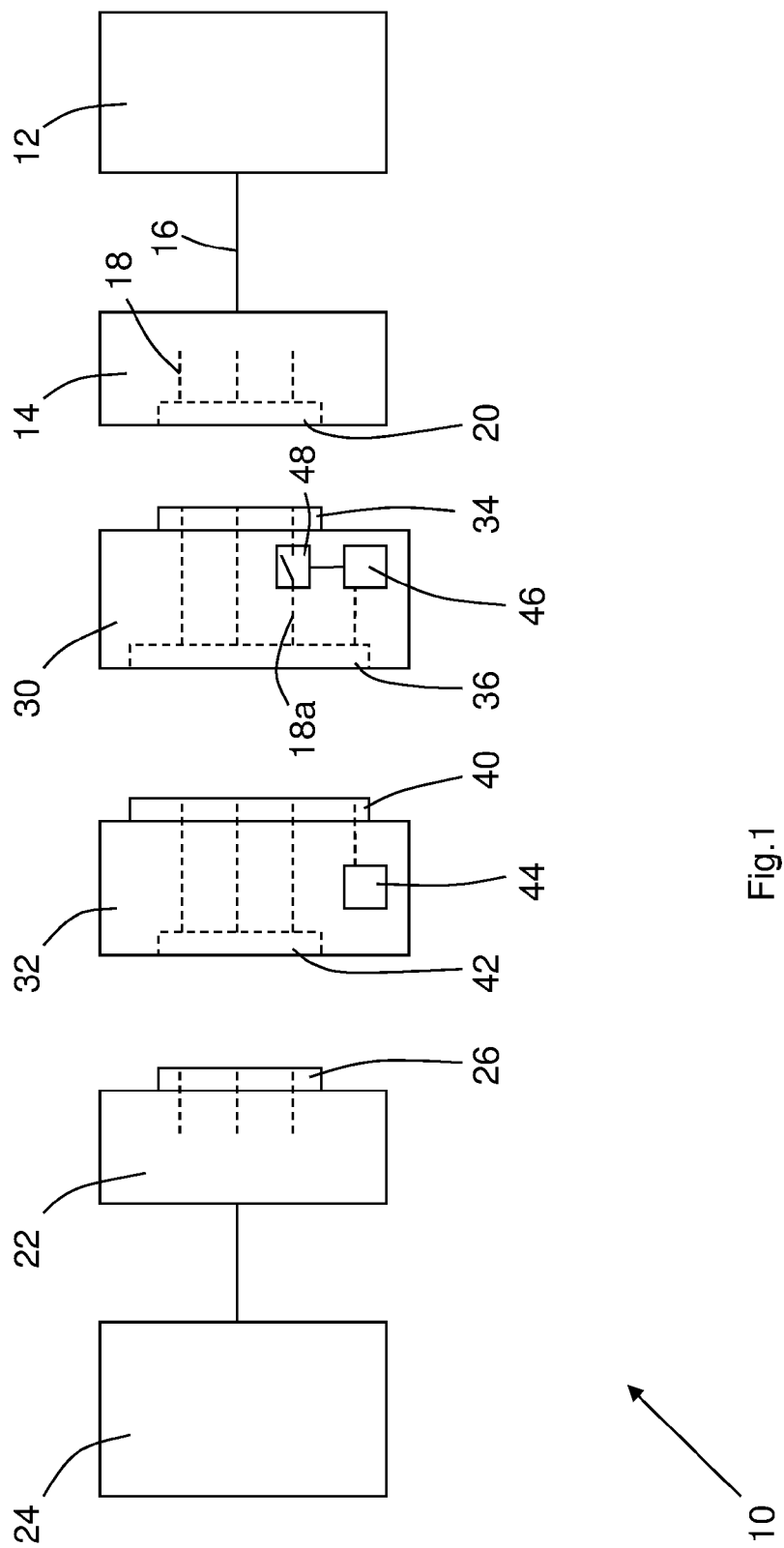

This invention relates to a vehicle security arrangement. The invention relates in particular to a security arrangement for a motor vehicle having a vehicle management system and an on board diagnostics port to permit the external interrogation of the management system.

BACKGROUND TO THE INVENTION

Many motor vehicles are fitted with an electronic engine management system which controls the operation of the engine. The engine management system, and the control routines of that system, typically include on board diagnostics by which the engine management system is able to assess the performance of the engine against certain criteria. One of the most important criteria is the emissions from the engine, and legislators have for many years required vehicle manufactures to provide on board diagnostics ("OBD"), and also to provide a port by which a computer or other external device may be connected to the engine management system in order to access the engine management system.

The computer or other external device will typically be equipped with off board tools which can interrogate the on board diagnostics systems in order to retrieve fault codes, obtain live information and set (or reset) calibration values. The off board tools can therefore assess the immediate and long-term performance of the engine against particular criteria, including emissions.

The possession of an external device equipped with the necessary off board tools was originally limited to authorised specialists, for example authorised vehicle dealers equipped to service the vehicles of one or more manufacturers. Nowadays, however, there is an increasingly active independent sector and the availability of external devices able to access the OBD port, and the availability of the necessary off board tools to access the OBD systems, is becoming increasingly widespread.

Notwithstanding the original intention to provide an OBD port for locating and alleviating emissions faults, as the number of electronic systems on motor vehicles has increased the vehicle manufacturers have come to use the OBD port to access other information about the vehicle. The OBD system is therefore used by certain manufacturers to store information concerning the operation of an anti-lock braking system and a stability control system, for example.

Many vehicles have electronic vehicle management systems in addition to the engine management system, and the OBD system has been expanded to enable the OBD port to be used to allow off board tools to interrogate many different electronics systems of the vehicle, and to correct or re-calibrate those systems if required.

One such electronic system is the vehicle's immobiliser control system. Many modern cars have mechanical keys fitted with a transponder which can communicate with the vehicle's immobiliser control system, while others have a "keyless" system which avoids the requirement for a mechanical key. In both cases the immobiliser control system allows the vehicle to start only if a key having the correct identifier is present. Many vehicle manufacturers supply a vehicle with two (or perhaps more) keys and each key will have a different (and ideally unique) identifier. The immobiliser control system will store a record of the identifiers of all of the keys which are authorised to start the vehicle.

In case a key is lost or damaged, however, it is necessary that the vehicle's immobiliser control system can be accessed and re-programmed to accept the identifier of one or more replacement keys. In most vehicles this access is by way of the OBD port. Therefore, when a key is lost or damaged an external device equipped with the necessary off board tool to reprogram the immobiliser control system is connected to the vehicle by way of the OBD port.

This system is open to mis-use, however, in that the immobiliser control system can be re-programmed as a means to steal the motor vehicle. Thus, provided that access can be gained to the OBD port, and the necessary off board tool is available, the immobiliser control system can be re-programmed to accept a new key (which is in the possession of an intending thief). As the availability of external devices to access the OBD port and the necessary off board tools increases, many are finding their way into the hands of unscrupulous individuals willing to adopt this method of vehicle theft.

In order to access the OBD port it is necessary to obtain entry to the vehicle. The vehicle owner may willingly allow access to the vehicle for valet parking for example, including long-term parking at airports and the like where the vehicle is legitimately driven by a third party. Also, access to a rental vehicle may be given to many individuals. Furthermore, a damaged vehicle may be given to a repairer who necessarily needs access to the vehicle.

Unauthorised entry into a vehicle may also be obtained, enabling access to the OBD port. For example, a vehicle owner may not lock a vehicle when it is stored in a private garage, and an intending thief may be able to obtain access to a locked garage and subsequently to the unlocked vehicle. It is also known that the security systems of some (locked) vehicles permit a window to be broken and the OBD port to be accessed without triggering the alarm.

It will be understood that a motor vehicle offering "keyless" operation (for which it is necessary only to bring the key within range of the vehicle for the immobiliser to be deactivated) are at the greatest risk from unauthorised access to the OBD port, but even a vehicle which requires a mechanical key will be vulnerable to attack, and once the immobiliser has been overcome the intending thief can seek to overcome the limited protection offered by the mechanical key.

Once the immobiliser control system has been re-programmed the vehicle will accept the identifier of the new key at any time, and an intending thief can locate and steal the vehicle at any subsequent time, i.e. if the thief has temporary access to the vehicle for valet parking, for example, he or she will likely steal the vehicle only after it has been returned to the owner.

SUMMARY OF THE INVENTION

The inventors have sought to reduce or avoid the possibility of the unauthorised re-programming of a vehicle's immobiliser control system and thereby to increase the security of the motor vehicle.

According to the invention there is provided a security arrangement for a motor vehicle having an OBD port, the security arrangement comprising a blocker having an electrical line, a switch and a controller to control the position of the switch, the switch having a closed position in which the electrical line is complete and an open position in which the electrical line is incomplete, the controller having a record of an identifier and being configured to close the switch when the identifier is communicated to the blocker.

The blocker can be adapted for connection to the OBD port in retro-fit applications, or it can form a part of the OBD port in original equipment applications.

It can be arranged that the electrical line of the blocker is connected to the immobiliser control system, so that when the switch is open the off board tools cannot access the immobiliser control system and cannot re-program that system to accept a new key. The identifier can be kept secret by the vehicle owner during normal use of the vehicle (including for example when the vehicle is to be parked by a valet for example) and can be provided only when required, for example during routine servicing of the vehicle or when a key has been lost.

It is recognised that the OBD port is of a standard format having sixteen electrical terminals. The connections to nine of the electrical terminals are determined by legislation. The vehicle manufacturers can use some or all of the other seven electrical terminals as they wish. At the present time, the particular electrical terminals which are used for the immobiliser control system vary between vehicle manufacturers, and so the electrical line of a retro-fit blocker with a single switch will similarly have to vary. It is hoped, however, that the vehicle manufacturers will in time commonise the functions of all sixteen of the electrical terminals so that a common retro-fit blocker having a single switch can be used for all motor vehicles.

Alternatively, the blocker can have multiple switches for multiple electrical lines so as to ensure that the blocker can control the electrical line which is connected to the immobiliser control system regardless of the different electrical terminals used by different vehicle manufacturers. The controller ideally actuates the multiple switches together. In this alternative arrangement the multiple electrical lines within the blocker (which can if desired comprise all sixteen electrical lines connected to the OBD port) can be completed or broken by the respective switches.

It is also recognised that the terminal of the OBD port which is connected to the immobiliser control system is in some vehicles also connected to other parts of the vehicle management system. Thus, when the motor vehicle is undertaking a service it may be necessary to provide the identifier so that the service agent has access to all of the vehicle management systems, even though access to the immobiliser control system is not required. This is only a minor disadvantage provided that the vehicle owner uses only trusted service agents.

The security arrangement can include an adaptor for connection to the blocker, the adaptor having a memory in which is stored the identifier. It can therefore be arranged that when the adaptor is connected to the blocker the controller can access the memory and locate the identifier. In such arrangements the vehicle owner can retain the adapter in a safe and secure location remote from the vehicle, and only provide it to trusted service agents when required.

Preferably, however, a separate adaptor is not required and the blocker has data-input means by which the identifier can be inputted to the controller. The data-input means may be contact-less, for example a wireless receiver adapted to receive a wireless signal. Ideally, the data-input means is a wireless transceiver adapted to cooperate with a transponder such as an RFID tag. Alternatively, the data-input means may be a contact data-input means, for example a contact pad adapted to cooperate with a separate touch key, the touch key storing the identifier and communicating it to the controller when the touch key engages a contact pad. Another type of suitable contact data-input means is a keypad for example.

Whilst arrangements in which the blocker has data-input means still require the vehicle owner to retain the touch key or the like, these arrangements are preferred as it is expected to be less likely that the identifier will not be passed on to the new owner when the vehicle is sold.

In embodiments utilising an adapter, the requirement to physically connect the adaptor to the blocker can provide an additional level of security. Thus, whilst it is necessary that the blocker and the adaptor have a set of cooperating electrical terminals, it is not necessary that the cooperating terminals share the standard format of the OBD port. It can therefore be arranged that the external device having a connector of standard format for fitment to the OBD port cannot be connected directly to the blocker, and can only be indirectly connected to the blocker by way of the adaptor.

In embodiments designed for retro-fitment to an existing vehicle, the blocker will have a set of sixteen primary terminals to cooperate with the standard sixteen-terminal format of the OBD port. The blocker can be secured to the OBD port by adhesive or the like, so that the blocker is substantially permanently secured to the OBD port. In embodiments in which the blocker has data-input means the blocker will have a corresponding set of sixteen primary terminals for connection to the external device. On the other hand, in embodiments utilising an adaptor the blocker will have a set of at least sixteen secondary terminals to cooperate with the adaptor. At least sixteen terminals are required so as to permit communication to the sixteen terminals of the OBD port plus a number of additional terminals by which the controller communicates with the memory of the adaptor (and provides electrical power to the adaptor if required).

Ideally, the format of the secondary terminals is dissimilar to the format of the OBD port, so that it is not possible to plug the external device (having the standard sixteen-terminal format) directly into the blocker. The adaptor has a set of sixteen primary terminals by way of which it may be connected to the external device (the format of the primary terminals of the adaptor therefore matching the format of the OBD port). The adaptor also has a set of at least sixteen secondary terminals to cooperate with the secondary terminals of the blocker.

In use, when the adaptor is connected to the blocker and an external device is connected to the adaptor, the sixteen terminals of the OBD port communicate indirectly with the sixteen terminals of the external device by way of the blocker and the adaptor. The electrical line of the blocker which has the switch forms part of the electrical pathway between one of the sixteen terminals of the OBD port and the respective terminal of the external device, and it is necessary for the switch to be closed in order for the external device to have access to all of the vehicle management systems.

Preferably, the blocker and the adaptor have cooperating formations adjacent to their respective secondary terminals, the formations permitting the adaptor to be physically connected (i.e. plugged into) the blocker. Ideally the formations prevent the external device being connected to the blocker, i.e. there is a physical interaction between the external device and the blocker which prevents the electrical terminals of the external device from being moved into engagement with the electrical terminals of the blocker.

There is also provided a first embodiment of vehicle security arrangement comprising an OBD port with a blocker, the blocker having an electrical line containing a switch and a controller to control the position of the switch, the controller having a memory in which is stored an identifier, the blocker having data-input means by which the identifier can be inputted to the controller, the controller being configured to close the switch when the identifier is communicated to the blocker.

There is also provided a second embodiment of vehicle security arrangement comprising an OBD port fitted with a blocker having a set of at least sixteen electrical terminals, an adaptor configured to cooperate with the blocker, the adaptor having a set of sixteen primary terminals in a first format, the format of the at least sixteen electrical terminals of the blocker being in a second format which is different to the first format, the adaptor having a set of at least sixteen secondary terminals in the second format, the blocker having an electrical line containing a switch and a controller to control the position of the switch, the adaptor having a memory in which is stored an identifier, the controller having a record of the identifier and being configured to close the switch when the adaptor is connected to the blocker.

BRIEF DESCRIPTION OF THE PREFERRED EMBODIMENTS

The invention will now be described in more detail, by way of example, with reference to the accompanying drawings, which show:

FIG. 1 a representation of one embodiment of a vehicle security arrangement of the present invention.

Figure 2:
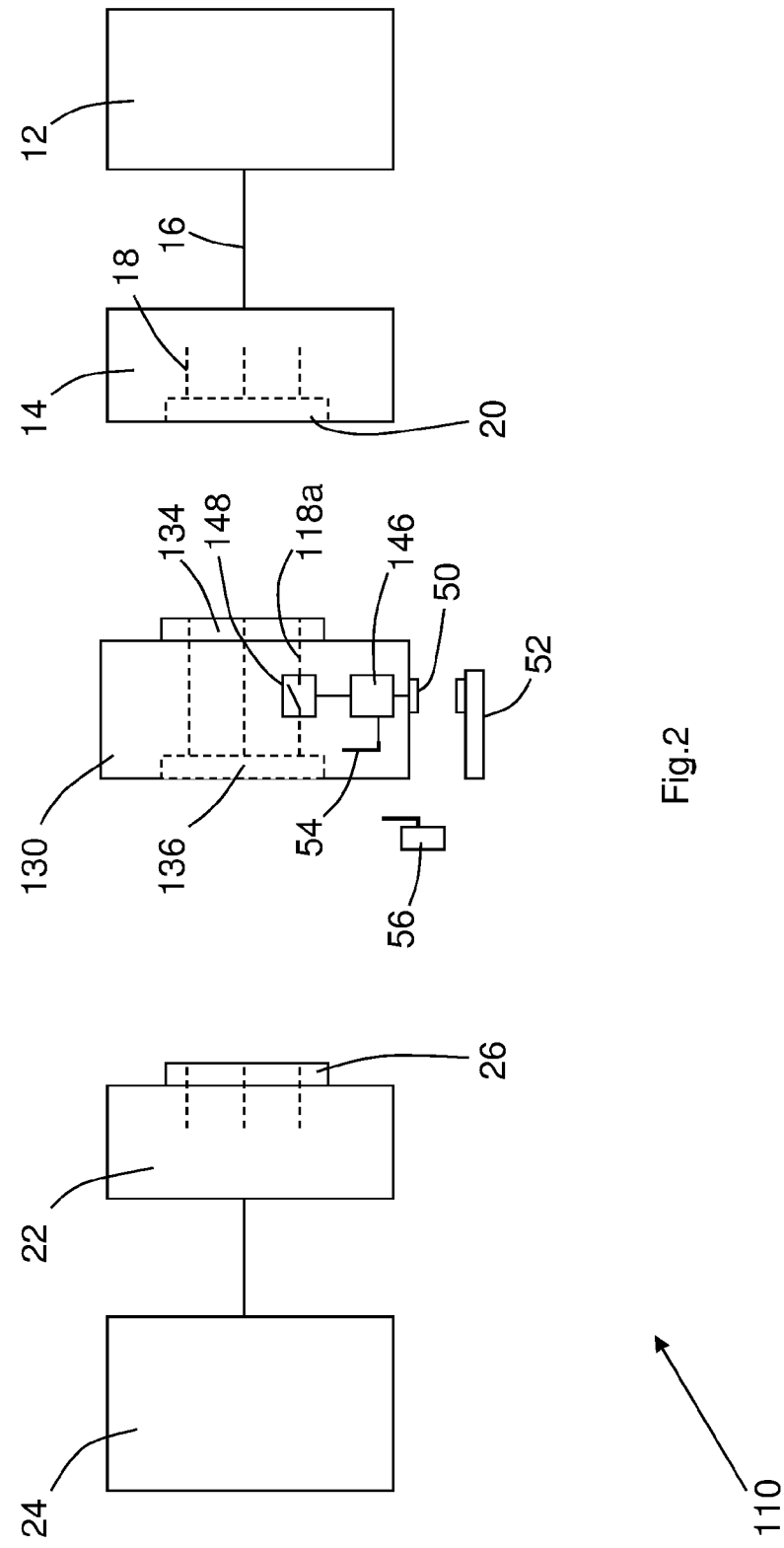

FIG. 2 a representation of another embodiment of vehicle security arrangement.

DETAILED DESCRIPTION

In common with a conventional motor vehicle, the vehicle security arrangement 10 of the present invention comprises a vehicle management system 12 which is connected to an OBD port 14. It will be understood that whilst the vehicle management system is represented in the drawing as a single unit communicating with the OBD port by way of a single electrical cable 16, in practice there will usually be several control systems located around the vehicle, many of which will communicate with the OBD port 14 by way of separate cables.

The electrical cable 16 is split within the OBD port into sixteen separate wires 18, each of which is connected to one of sixteen electrical terminals of the OBD port. It will be understood that some motor vehicles do not use all sixteen of the terminals so that the cable 16 may in some embodiments be split into less than sixteen wires. In any event, however, the physical configuration of the connector 20 of the OBD port 14, and the location of each of the electrical terminals within the connector 20, are of standard format.

For ease of understanding, only three of the sixteen wires 18 within the OBD port 14 are represented in FIG. 1.

An external device 22 is adapted for connection to a portable computer (or to non-portable diagnostics equipment) 24 which is external to the vehicle. The external device 22 has a connector 26 comprising sixteen electrical terminals, the configuration of the electrical terminals being of standard format and arranged to cooperate with the sixteen electrical terminals of the OBD port 14. The physical configuration of the connector 26 is therefore designed to cooperate with the physical configuration of the connector 20 of the OBD port 14, and the connectors 20, 26 will typically include cooperating formations and the like.

It will be understood that in a conventional motor vehicle having an OBD port 14, the external device 22 can be plugged directly into the OBD port 14 whereby to access the vehicle management system 12.

The present invention places a blocker 30, and in this embodiment also an adaptor 32, between the OBD port 14 and the external device 22. The embodiment shown is for retro-fitment to an existing OBD port and so the blocker 30 has a primary connector 34 configured to cooperate with the OBD port 14. Specifically, the primary connector 34 has sixteen primary electrical terminals configured to connect to respective electrical terminals of the OBD port. The blocker 30 has a secondary connector 36 comprising (in this embodiment) a set of seventeen secondary electrical terminals.

The blocker 30 is designed to be substantially permanently connected to the OBD port 14 and therefore to remain with the vehicle throughout its life. In a retro-fit application the blocker 30 may be secured to the OBD port 14 by adhesive for example.

It will be understood that if the vehicle security arrangement 10 is designed for fitment as original equipment to a new vehicle, the connectors 20 and 34 can be dispensed with and the OBD connector 14 and blocker 30 can be made as a single integrated component.

It will also be understood that in some existing vehicles the access adjacent to the OBD port is limited. In some vehicles for example it will not be physically possible to fit a blocker 30, adaptor 32 and external device 22 to the OBD port 14 in a linear array in the space available. In those vehicles it will be necessary to fit a separate "bridging" component to the OBD port 14, the bridging component having a first connector for connection to the OBD port and a second connector comprising the blocker (or comprising another connector to which the blocker 30 can be connected), there being a flexible cable between the first connector and the second connector enabling the blocker to be located at a more convenient location.

The adaptor 32 has a secondary connector 40 comprising (in this embodiment) seventeen terminals, the secondary connector 40 of the adaptor being configured to cooperate with the secondary connector 36 of the blocker 30. The adaptor 32 also has a primary connector 42 comprising sixteen terminals. The format of the primary connector 42 matches the format of the connector 20 of the OBD port 14, so that the connector 26 of the external device 22 can be connected to the primary connector 42.

The seventeenth electrical terminal of the adaptor 32 is connected to a memory unit 44 in which is stored an identifier. The seventeenth electrical terminal of the blocker 30 is connected to a controller 46. The controller 46 is also connected to a switch 48 which can move between a closed position in which the electrical line 18a is complete, and an open position (as shown) in which the electrical line 18a is broken.

It is arranged that the electrical line 18a is part of the electrical pathway which connects to the immobiliser control system of the vehicle (though it is recognised that the line 18a may connect to other parts of the vehicle management system 12 also). In other embodiments the switch 48 can open more than one electrical line 18 within the blocker 30 as desired.

It is also arranged that the switch 48 is normally open, so that some positive action needs to be taken to complete the electrical line 18a and allow communication to the immobiliser control system. When the adaptor 32 is connected to the blocker 30 the respective seventeenth terminals engage. The controller 46 is configured to access the memory unit 44. The controller 46 has its own memory unit and if the identifier of the adaptor 32 matches the identifier of the controller 46 the controller causes the switch 48 to close and complete the electrical line 18a.

It will thereby be understood that when the adaptor 32 having the correct identifier is connected to the blocker 30, and the external device 22 is connected to the adaptor 32, the computer or other diagnostics equipment 24 can access all of the vehicle's management systems 12, including the immobiliser control system. All of the vehicle's diagnostics can be accessed and the immobiliser control system can be re-calibrated to accept a replacement key if required.

Without the adaptor 32, however, the external device 22 cannot physically be connected to the OBD port 14. The connector 36 of the blocker 30 has formations which preclude fitment of the connector 26 of the external device (the physical mismatch being represented in the drawing by the different sizes of the respective connectors). In other embodiments there is no physical mismatch preventing connection of the external device 22 so that this additional level of security may not be utilised. In any event, however, without the correct adaptor 32 communicating the identifier to the controller 46 the switch 48 will remain open and the immobiliser control system cannot be accessed, even in those embodiments in which the external device 22 can be physically connected to the blocker 30.

The vehicle owner can therefore store the adaptor 32 in a safe place, and can provide the adaptor 32 only to known and trusted persons, for example an authorised repairer or agent for servicing the vehicle. The vehicle owner does not need to provide the adaptor 32 to all persons having access to the vehicle, for example to a valet or to a person hiring a rental vehicle.

It is recognised that at present different vehicle manufacturers use different electrical terminals (and therefore a different electrical line 18) to communicate with the immobiliser control system. It is therefore necessary either to provide a different blocker depending upon the vehicle concerned, or else to provide multiple switches 48 which can break multiple (or perhaps all of) the electrical lines 18 together.

The supplier of the vehicle security arrangement 10 could have a facility to overcome the problem of a lost adaptor 32 (or an adaptor which is not supplied to the new owner when the vehicle is sold), following appropriate checks to ensure that the request is being made by the vehicle's owner. One such facility could be to connect an adaptor (perhaps a "master" adaptor available only to the supplier) to the blocker 30 of the vehicle, to re-program the controller 46 to accept a new identifier. Another option could be to provide a replacement adaptor and to instruct the owner to undertake a particular operation (or sequence of operations), the correct operation (or the correct sequence of operations) causing the blocker to accept the new adaptor.

Whilst the blocker 30 and adaptor 32 of the embodiment described each have only a single additional terminal by which the controller 46 communicates with the memory 44 of the adaptor, other embodiments can have two or more additional cooperating terminals as required. For example, additional cooperating terminals may be required for the blocker and adaptor in order to communicate electrical power to the adaptor.

Specifically, electrical power for the adaptor 32 and blocker 30 is provided by way of the vehicle's electrical system. No power is required when the adaptor is not present, but it will be understood that there is a permanent vehicle positive voltage provided at a designated terminal of the OBD port 14. The controller can be connected directly to that designated terminal if desired, but preferably the controller receives its electrical power by way of the adaptor. Accordingly, in one embodiment the adaptor is configured to communicate the voltage back to the blocker (by way of a first pair of cooperating additional terminals) in order to power the controller. Further additional terminals are provided between the blocker and adaptor which in turn allow the blocker 30 to provide power to the memory 44 of the adaptor. The connectors will have the appropriate number of cooperating terminals to allow the required power communication in addition to the sixteen primary terminals of the connectors 20 and 34, and also in addition to the terminals permitting the controller to access the memory of the adaptor. In the event that the voltage required by the controller 46 and memory 44 differ from that provided by the vehicle's electrical system, the blocker can include means to regulate the voltage as required.

It is arranged that the switch 48 remains closed as long as the adaptor 32 is plugged into the blocker 30. Once the adaptor 32 is removed, the switch 48 is opened and thereafter remains open until the adaptor 32 is re-connected.

FIG. 2 shows an alternative vehicle security arrangement which shares many of the features and components with the embodiment of FIG. 1, the shared components being given the same reference numerals. The embodiment of FIG. 2 does not require a separate adaptor and therefore avoids the possibility that the adaptor will be lost, or is not transferred to a new owner when the vehicle is sold.

The security arrangement of FIG. 2 places a blocker 130 between the OBD port 14 and the external device 22. The embodiment shown is for retro-fitment to an existing OBD port and so the blocker 130 has a primary connector 134 configured to cooperate with the connector 20 of the OBD port 14. Specifically, the primary connector 134 has sixteen electrical terminals configured to cooperate with the OBD port. The blocker 130 has a secondary connector 136 comprising a similar set of sixteen electrical terminals, the secondary connector 136 in this embodiment matching the connector 20 of the OBD port 14. Thus, in this embodiment the external device 22 can be plugged directly into the blocker 130 without requiring a separate adaptor.

The blocker 130 is designed to be substantially permanently connected to the OBD port 14 and therefore to remain with the vehicle throughout its life. In a retro-fit application the blocker 130 may be secured to the OBD port 14 by adhesive for example. It will be understood that if the vehicle security arrangement 110 is designed for fitment as original equipment to a new vehicle, the connectors 20 and 134 can be dispensed with and the OBD connector 14 and blocker 130 can be made as a single integrated component.

The blocker 130 includes a controller 146 which is connected to a switch 148 which can move between a closed position in which the electrical line 118a is complete, and an open position (as shown) in which the electrical line 118a is incomplete.

It is arranged that the electrical line 118a is part of the electrical pathway which connects to the immobiliser control system of the vehicle (though it is recognised that the line 118a may connect to other parts of the vehicle management system 12 also). In other embodiments the switch 148 can open more than one electrical line within the blocker 130 as desired.

It is also arranged that the switch 148 is normally open, so that some positive action needs to be taken to complete the electrical line 118a and allow communication to the immobiliser control system.

The controller 146 has an internal memory in which is stored an identifier. When it is desired to close the switch 148 and complete the electrical connections between the primary and secondary connectors 134 and 136, the identifier must be inputted to the blocker 130.

For ease of understanding in the embodiment shown the blocker 130 has both contact and contact-less data-input means. The contact data-input means is a contact pad 50 which cooperates with a touch key 52, the touch key being adapted to communicate data including an identifier to the controller 146 when it engages the contact pad 50. (Alternatively, the data-input means may be a keypad and the identifier is a known series of numbers and/or letters which the user must enter into the keypad.)

In addition, the blocker 130 has a contact-less data-input means in the form of a transceiver 54 which can issue a signal to a nearby transponder 56 (such as an RFID chip for example), and receive data including an identifier issued by the transponder 56.

In practical embodiments it is expected that the blocker will have only a contact data-input means 50, or will have only a contact-less data-input means 52, as desired.

If the identifier which is inputted through the data-input means 50, 54 matches the identifier stored in the memory of the controller 146, the controller 146 causes the switch 148 to close and complete the electrical line 118a, allowing the external device 22 to have full access to the vehicle management system 12 by way of the OBD port 14.

Without the correct identifier the external device 22 cannot communicate with some or all of the electrical lines within the OBD port 14, and the external device can therefore undertake only limited actions in relation to the vehicle, as determined by the electrical lines which are not interrupted by the switch 148. In those vehicles in which the electrical line 18a communicates only with the vehicle immobiliser system, the identifier will only need to be provided if the vehicle's key is lost.

It is arranged that the switch 148 remains closed as long as the external device 22 is plugged into the blocker 130. Once the external device 22 is removed, the switch 148 is opened and thereafter remains open until the identifier is inputted again.

The vehicle owner can store the touch key 52 or transponder 56 (as applicable) in a safe place remote from the vehicle. However, so as to reduce the likelihood that the touch key 52 or transponder 56 is not transferred to a new owner of the vehicle, it can be stored on a key-ring with the vehicle key. The owner can nevertheless provide the touch key 52 or transponder 56 only to known and trusted persons, and does not need to provide the touch key 52 or transponder 56 to all persons having access to the vehicle. In the event that the touch key 52 or transponder 56 is stored on a key-ring with the vehicle's key, it may be removed before the keys are handed to an airport parking valet for example, as presently often occurs with the owner's house key.

The invention claimed is:

1. A security arrangement for a motor vehicle having an OBD port, the security arrangement comprising a blocker adapted for retro-fitment to the OBD port with primary connector comprising sixteen electrical terminals for connection to the sixteen electrical terminals of the OBD port, the blocker having a secondary connector comprising sixteen electrical terminals for connection to an external device, the format of the secondary connector matching the format of the OBD port, the blocker having an electrical line which is connected to one of the sixteen electrical terminals of the primary connector and to one of the sixteen electrical terminals of the secondary connector, the blocker also having a switch and a controller to control the position of the switch, the switch having a closed position in which the electrical line is complete and an open position in which the electrical line is incomplete, the controller having a record of an identifier and being configured to close the switch when the identifier is communicated to the controller.

2. The security arrangement according to claim 1 in which the blocker has data-input means by which the identifier can be inputted to the controller.

3. The security arrangement according to claim 2 in which the data-input means is contact-less.

4. The security arrangement according to claim 3 in which the data-input means is a wireless transceiver adapted to cooperate with a transponder.

5. The security arrangement according to claim 2 in which the data-input means is a contact pad adapted to cooperate with a touch key.

6. A security arrangement according to claim 1, in which the blocker has multiple electrical lines and multiple switches.

7. The security arrangement according to claim 1 in which the blocker has multiple electrical lines connected to respective electrical terminals of the primary connector and to respective electrical terminals of the secondary connector, and multiple switches.

8. The security arrangement according to claim 7 in which the controller actuates the multiple switches together.

9. The security arrangement according to claim 7 in which the blocker has sixteen electrical lines, one electrical line being connected to each of the respective electrical terminals of the primary connector and the secondary connector, and sixteen switches.

10. The security arrangement according to claim 1 in which the switch is normally open and is closed by the controller.

11. The security arrangement according to claim 1 in which the controller receives electrical power by way of the OBD port.

12. A vehicle security arrangement comprising an OBD port fitted with a blocker, the blocker having a primary connector comprising sixteen electrical terminals connected to the sixteen electrical terminals of the OBD port, the blocker having a secondary connector comprising sixteen electrical terminals for connection to an external device, the format of the secondary connector matching the format of the OBD port, the blocker having an electrical line which is connected to one of the sixteen electrical terminals of the primary connector and to one or the sixteen electrical terminals of the secondary connector, the blocker containing a switch and a controller to control the position of the switch, the controller having a record of an identifier, the blocker having data-input means by which the identifier can he inputted to the controller, the controller being configured to close the switch when the identifier is communicated to the blocker.

* * * * *